(12) United States Patent
Condurso

(10) Patent No.: US 8,640,273 B1
(45) Date of Patent: Feb. 4, 2014

(54) ANIMAL WASTE DISPOSAL SYSTEM

(76) Inventor: Frank J. Condurso, St. Petersburg, FL (US)

( * ) Notice: Subject to any disclaimer, the term of this patent is extended or adjusted under 35 U.S.C. 154(b) by 498 days.

(21) Appl. No.: 12/802,657

(22) Filed: Jun. 11, 2010

(51) Int. Cl.
A47K 11/02 (2006.01)

(52) U.S. Cl.
USPC .............................................................. 4/449

(58) Field of Classification Search
USPC .............................. 4/449; 119/161, 165, 167;
110/227–228, 256–259, 165 R, 233,
110/224, 219, 216, 235, 253–255
See application file for complete search history.

(56) References Cited

U.S. PATENT DOCUMENTS

| | | | | |
|---|---|---|---|---|
| 4,285,719 A * | 8/1981 | Criss | .................................. | 71/13 |
| 4,347,632 A * | 9/1982 | Criss | .................................. | 4/449 |
| 5,394,833 A * | 3/1995 | Glass | ............................. | 119/166 |
| 5,582,134 A * | 12/1996 | Simmons | ....................... | 119/166 |
| 6,135,035 A * | 10/2000 | Masek | ........................... | 110/228 |
| 6,202,595 B1 * | 3/2001 | Atcravi | .......................... | 119/165 |
| 6,367,395 B1 * | 4/2002 | Masek | ........................... | 110/345 |
| 6,453,844 B1 * | 9/2002 | Janzen et al. | .................. | 119/163 |
| 7,121,421 B2 * | 10/2006 | Yang et al. | ..................... | 220/263 |
| 2009/0255477 A1 * | 10/2009 | Fournier et al. | ............... | 119/161 |
| 2012/0073507 A1 * | 3/2012 | Anderson | ...................... | 119/161 |

* cited by examiner

Primary Examiner — Lori Baker

(57) ABSTRACT

A coupling component has upper and lower surfaces. A nipple extends downwardly for securement to a clean out line. A passageway extends centrally through the coupling component and nipple. A lid is movable between a closed orientation positioning the lid upon the upper surface of the coupling component and an open orientation positioning the lid at an angle with respect to the upper surface of the coupling component. A pedal operatively couples the lid with respect to the coupling component. A spring has a first end operatively coupled with respect to the pedal and a second end operatively coupled with respect to the coupling component. When a user steps on the pedal, the lid will rotate upwardly to the open orientation. When a user removes a foot from the pedal, the spring will rotate the lid to the closed orientation.

2 Claims, 2 Drawing Sheets

FIG. 1
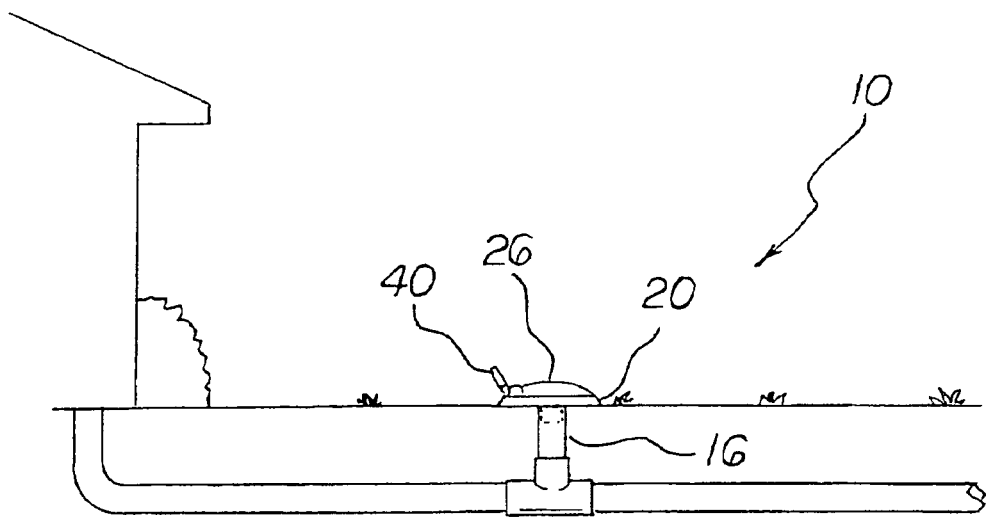
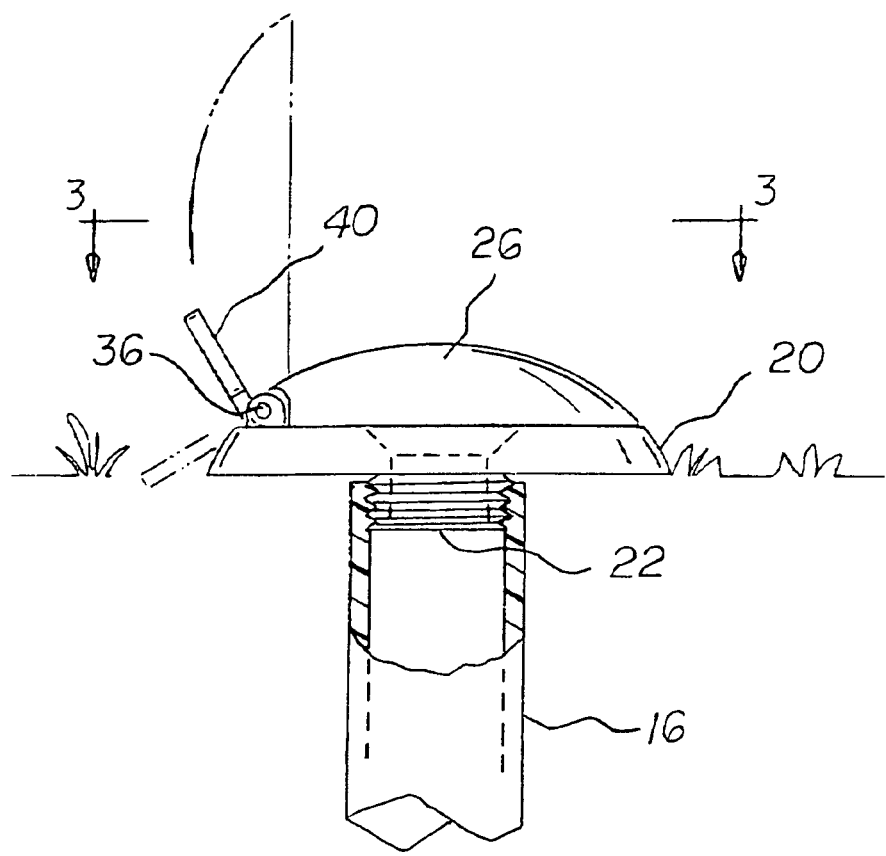
FIG. 2

ANIMAL WASTE DISPOSAL SYSTEM

BACKGROUND OF THE INVENTION

Field of the Invention

The present invention relates to an animal waste disposal system and more particularly pertains to ecologically friendly disposing of fecal matter of a pet, the disposing being done in a safe, clean, convenient and ecological manner.

SUMMARY OF THE INVENTION

In view of the foregoing disadvantages inherent in the known types of waste disposal systems of known designs and configurations now present in the prior art, the present invention provides an improved animal waste disposal system. As such, the general purpose of the present invention, which will be described subsequently in greater detail, is to provide a new and improved animal waste disposal system and method which has all the advantages of the prior art and none of the disadvantages.

To attain this, the present invention essentially comprises an animal waste disposal system. First provided is a generally horizontal four-inch sewage line. The sewage line passes from a user's home to a community sewage treatment plant. A generally vertical four-inch clean out line is provided. The clean out line has a lower end. The lower end of the clean out line is operatively coupled to the sewage line. The clean out line has a threaded upper end. The upper end of the clean out line terminates at about ground level.

A coupling component is provided. The coupling component has a shape of a truncated hemisphere. The coupling component has a generally planar upper surface. The coupling component has a generally planar lower surface. The coupling component has a centrally positioned, downwardly extending, threaded nipple. The nipple has external threads. In this manner the nipple may be removably secured to the upper end of the clean out line. A generally vertical passageway extends centrally through the coupling component including the nipple.

A lid is provided. The lid has the shape of a hemisphere. The lid has a generally planar lower surface. The lid has a linear cut-out. The linear cut-out is provided in an edge of the lid for rotating between 85 and 95 degrees. The lid is movable between a closed orientation and an open orientation. In the closed orientation the lower surface of the lid rests upon the upper surface of the coupling component. In this manner a low profile hemispherical dome is formed. In the open orientation the lower surface of the lid is provided at about 90 degrees with respect to the upper surface of the coupling component and the cut-out provided adjacent to the coupling component.

Further provided is an actuation assembly. The actuation assembly includes two laterally spaced upstanding exterior collars. The exterior collars are formed with the coupling component. The exterior collars have axially aligned apertures. The actuating assembly also includes two laterally spaced upstanding interior collars. The interior collars are formed with the lid. The interior collars have axially aligned apertures. The apertures of the interior collars are alignable with the apertures of the exterior collars. A carriage bolt is provided. The carriage bolt extends through the apertures of the interior and exterior collars. The collars and carriage bolt are located in the cut-out. A pedal is provided. The pedal is formed with one of the interior collars and the lid. The pedal extends upwardly at about 45 degrees when in the closed orientation. The pedal extends downwardly at about 45 degrees when in the open orientation. The coupling component, lid collars and pedal are formed of polyvinyl chloride.

Provided last is a coil spring. The coil spring is positioned on the carriage bolt between the interior collars. The coil spring has a first end. The first end is operatively coupled to the pedal and the lid. The coil spring has a second end. The second end is operatively coupled to the coupling component. In this manner the lid will rotate upwardly to the open orientation when a user steps on the pedal. Also in this manner access is provided for dropping pet fecal waste into the clean out line and sewage line. Further in this manner the spring will rotate the lid to the closed orientation when a user removes a foot from the pedal.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved animal waste disposal system which has all of the advantages of the prior art waste disposal systems of known designs and configurations and none of the disadvantages.

It is another object of the present invention to provide a new and improved animal waste disposal system which may be easily and efficiently manufactured and marketed.

It is a further object of the present invention to provide a new and improved animal waste disposal system which is of durable and reliable constructions.

An even further object of the present invention is to provide a new and improved animal waste disposal system which is susceptible of a low cost of manufacture with regard to both materials and labor, and which accordingly is then susceptible of low prices of sale to the consuming public, thereby making such animal waste disposal system economically available to the buying public.

Even still another object of the present invention is to provide an animal waste disposal system for ecologically friendly disposing of fecal matter of a pet, the disposing being done in a safe, clean, convenient and ecological manner.

Lastly, it is an object of the present invention to provide a new and improved animal waste disposal system. A coupling component has upper and lower surfaces. A nipple extends downwardly for securement to a clean out line. A passageway extends centrally through the coupling component and nipple. A lid is movable between closed and open orientations. The closed orientation positions the lid upon the upper surface of the coupling component. The open orientation positions the lid at an angle with respect to the upper surface of the coupling component. A pedal operatively couples the lid with respect to the coupling component. A spring has a first end operatively coupled with respect to the pedal. The spring has a second end operatively coupled with respect to the coupling component. When a user steps on the pedal, the lid will rotate upwardly to the open orientation. When a user removes a foot from the pedal, the spring will rotate the lid to the closed orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of an animal waste disposal system constructed in accordance with the principles of the present invention.

FIG. 2 is an enlarged side elevational view of the system, partly in cross section, taken at the Circle 2 of FIG. 1.

The same reference numerals refer to the same parts throughout the various Figures.

DESCRIPTION OF THE PREFERRED EMBODIMENT

Figure 3:
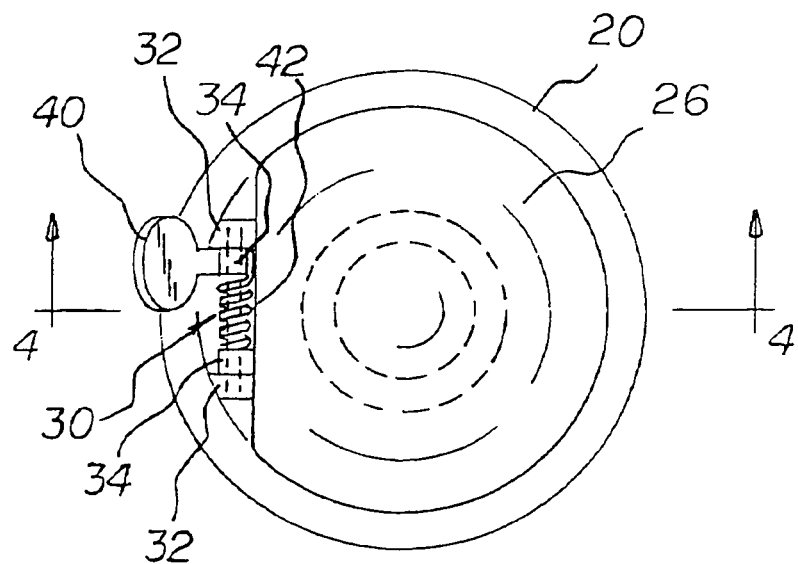
FIG. 3 is a plan view of the system taken along line 3-3 of FIG. 2.
Figure 4:
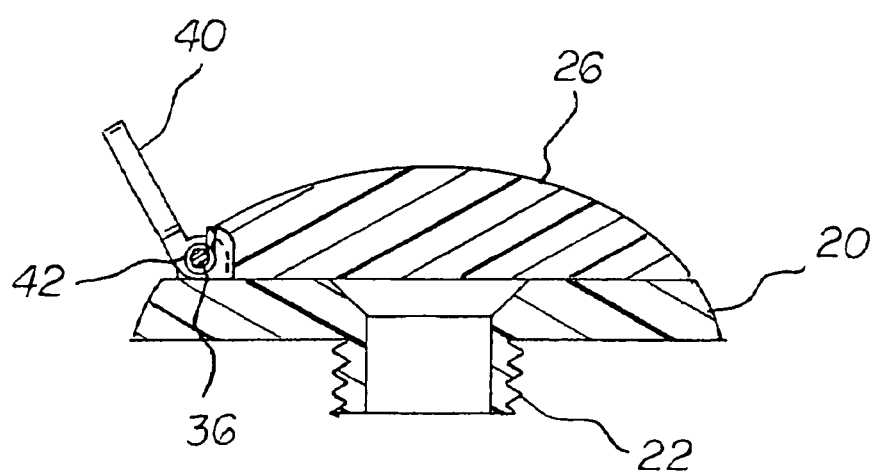
FIG. 4 is a cross sectional view of the system taken along line 4-4 of FIG. 3.

With reference now to the drawings, and in particular to FIG. 1 thereof, the preferred embodiment of the new and improved animal waste disposal system embodying the principles and concepts of the present invention and generally designated by the reference numeral 10 will be described.

The present invention, the animal waste disposal system 10 is comprised of a plurality of components. Such components in their broadest context include a coupling component, a lid, a pedal and a spring. Such components are individually configured and correlated with respect to each other so as to attain the desired objective.

First provided is a generally horizontal four-inch sewage line 14. The sewage line passes from a user's home to a community sewage treatment plant. A generally vertical four-inch clean out line 16 is provided. The clean out line has a lower end. The lower end of the clean out line is operatively coupled to the sewage line. The clean out line has a threaded upper end. The upper end of the clean out line terminates at about ground level.

A coupling component 20 is provided. The coupling component has a shape of a truncated hemisphere. The coupling component has a generally planar upper surface. The coupling component has a generally planar lower surface. The coupling component has a centrally positioned, downwardly extending, threaded nipple 22. The nipple has external threads. In this manner the nipple may be removably secured to the upper end of the clean out line. A generally vertical passageway extends centrally through the coupling component including the nipple.

A lid 26 is provided. The lid has the shape of a hemisphere. The lid has a generally planar lower surface. The lid has a linear cut-out. The linear cut-out is provided in an edge of the lid for rotating between 85 and 95 degrees. The lid is movable between a closed orientation and an open orientation. In the closed orientation the lower surface of the lid rests upon the upper surface of the coupling component. In this manner a low profile hemispherical dome is formed. In the open orientation the lower surface of the lid is provided at about 90 degrees with respect to the upper surface of the coupling component and the cut-out provided adjacent to the coupling component.

Further provided is an actuation assembly 30. The actuation assembly includes two laterally spaced upstanding exterior collars 32. The exterior collars are formed with the coupling component. The exterior collars have axially aligned apertures. The actuating assembly also includes two laterally spaced upstanding interior collars 34. The interior collars are formed with the lid. The interior collars have axially aligned apertures. The apertures of the interior collars are alignable with the apertures of the exterior collars. A carriage bolt 36 is provided. The carriage bolt extends through the apertures of the interior and exterior collars. The collars and carriage bolt are located in the cut-out. A pedal 38 is provided. The pedal is formed with one of the interior collars and the lid. The pedal extends upwardly at about 45 degrees when in the closed orientation. The pedal extends downwardly at about 45 degrees when in the open orientation. The coupling component, lid collars and pedal are formed of polyvinyl chloride.

Provided last is a coil spring 42. The coil spring is positioned on the carriage bolt between the interior collars. The coil spring has a first end. The first end is operatively coupled to the pedal and the lid. The coil spring has a second end. The second end is operatively coupled to the coupling component. In this manner the lid will rotate upwardly to the open orientation when a user steps on the pedal. Also in this manner access is provided for dropping pet fecal waste into the clean out line and sewage line. Further in this manner the spring will rotate the lid to the closed orientation when the user removes a foot from the pedal.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An animal waste disposal system comprising:

a coupling component having upper and lower surfaces, a nipple extending downwardly from the lower surface of the coupling component for securement to a clean out line, a passageway extending centrally through the coupling component and nipple;

a lid movable between closed and open orientations, the closed orientation positioning the lid upon the upper surface of the coupling component, the open orientation positioning the lid at an angle with respect to the upper surface of the coupling component;

a pedal operatively coupling the lid with respect to the coupling component, a spring having a first end operatively coupled with respect to the pedal and a second end operatively coupled with respect to the coupling component whereby when a user steps on the pedal, the lid will rotate upwardly to the open orientation and whereby when the user removes a foot from the pedal, the spring will rotate the lid to the closed orientation; and two laterally spaced upstanding exterior collars formed with the coupling component, the exterior collars having axially aligned apertures, the actuating assembly also including two laterally spaced upstanding interior collars formed with the lid, the interior collars having axially aligned apertures alignable with the apertures of the exterior collars, a bolt extending through the apertures of the interior and exterior collars, the spring being located on the bolt between the interior collars, the pedal being coupled to one of the components.

2. An animal waste disposal system (10) for the ecologically friendly disposing of fecal matter of a pet, the system comprising, in combination:

a generally horizontal four-inch sewage line (14) passing from a home of a user to a community sewage treatment plant, a generally vertical four-inch clean out line (16), the clean out line having a lower end operatively coupled to the sewage line, the clean out line having a threaded upper end terminating at about ground level;

a coupling component (20) having a shape of a truncated hemisphere, the coupling component having a generally planar upper surface, the coupling component having a generally planar lower surface with a centrally positioned, downwardly extending, threaded nipple (22) formed with external threads for removable securement to the upper end of the clean out line, a generally vertical passageway extending centrally through the coupling component including the nipple;

a lid (26) having the shape of a hemisphere, the lid having a generally planar lower surface, a linear cut-out formed in an edge of the lid for between 85 and 95 degrees, the lid being movable between a closed orientation and an open orientation, the closed orientation being with the lower surface of the lid resting upon the upper surface of the coupling component to form a low profile hemispherical dome, the open orientation being with the lower surface of the lid at about 90 degrees with respect to the upper surface of the coupling component and with the cut-out adjacent to the coupling component;

an actuation assembly (30) including two laterally spaced upstanding exterior collars (32) formed with the coupling component, the exterior collars having axially aligned apertures, the actuating assembly also including two laterally spaced upstanding interior collars (34) formed with the lid, the interior collars having axially aligned apertures alignable with the apertures of the exterior collars, a carriage bolt (36) extending through the apertures of the interior and exterior collars, the collars and carriage bolt being located in the cut-out, a pedal (38) formed with one of the interior collars and the lid, the pedal extending upwardly at about 45 degrees when in the closed orientation, the pedal extending downwardly at about 45 degrees when in the open orientation, the coupling component, lid collars and pedal being formed of polyvinyl chloride; and a coil spring (42) positioned on the carriage bolt between the interior collars, the coil spring having a first end operatively coupled to the pedal and the lid, the coil spring having a second end operatively coupled to the coupling component whereby when the user steps on the pedal, the lid will rotate upwardly to the open orientation to provide access for dropping pet fecal waste into the clean out line and sewage line and whereby when a user removes a foot from the pedal, the spring will rotate the lid to the closed orientation.

\* \* \* \* \*